(12) United States Patent
Pinto et al.

(10) Patent No.: US 8,098,304 B2
(45) Date of Patent: Jan. 17, 2012

(54) DYNAMIC IDENTIFICATION AND CORRECTION OF DEFECTIVE PIXELS

(75) Inventors: Victor Pinto, Zychron-Yaakov (IL); Diana Shaposhnik, Kiryat Haim (IL)

(73) Assignee: Zoran Corporation, Sunnyvale, CA (US)

( * ) Notice: Subject to any disclaimer, the term of this patent is extended or adjusted under 35 U.S.C. 154(b) by 297 days.

(21) Appl. No.: 12/037,699

(22) Filed: Feb. 26, 2008

(65) Prior Publication Data

US 2008/0143856 A1    Jun. 19, 2008

Related U.S. Application Data

(63) Continuation of application No. 10/615,277, filed on Jul. 7, 2003, now Pat. No. 7,388,609.

(51) Int. Cl.
*H04N 9/64* (2006.01)

(52) U.S. Cl. .................................................. 348/246

(58) Field of Classification Search .............. 348/246, 348/247, 251, 245; 382/254
See application file for complete search history.

(56) References Cited

U.S. PATENT DOCUMENTS

| | | |
|---|---|---|
| 5,327,246 A | 7/1994 | Suzuki |
| 5,381,175 A | 1/1995 | Sudo et al. |
| 5,805,216 A | 9/1998 | Tabei et al. |
| 5,982,946 A | 11/1999 | Murakami |
| 6,081,917 A | 6/2000 | Yasui et al. |
| 6,181,830 B1 | 1/2001 | Sato |
| 7,034,874 B1 | 4/2006 | Reinhart et al. |
| 7,388,609 B2 | 6/2008 | Pinto et al. |
| 2001/0036305 A1 | 11/2001 | Jun |
| 2003/0030738 A1 | 2/2003 | Clynes et al. |
| 2003/0063202 A1* | 4/2003 | Toyoda et al. ............ 348/246 |
| 2003/0222995 A1 | 12/2003 | Kaplinsky et al. |
| 2004/0051798 A1* | 3/2004 | Kakarala et al. .......... 348/246 |
| 2004/0169746 A1 | 9/2004 | Chen et al. |

FOREIGN PATENT DOCUMENTS

| | | |
|---|---|---|
| EP | 1003332 A2 | 5/2000 |
| EP | 1045578 A2 | 10/2000 |
| GB | 2364461 | 1/2002 |
| JP | 06-030425 A | 2/1994 |
| JP | 2000-059799 A | 2/2000 |
| JP | 2001-086517 | 3/2001 |
| JP | 2002-223391 A | 8/2002 |
| JP | 2002223391 * | 8/2002 |

(Continued)

OTHER PUBLICATIONS

ISA/EPO, "Notification of Transmittal of the International Search Report and the Written Opinion of the International Searching Authority, or the Declaration", mailed in corresponding International application No. PCT/US2004/019050, Sep. 30, 2004, 11 pages.

(Continued)

*Primary Examiner* — Gevell Selby
(74) *Attorney, Agent, or Firm* — Perkins Coie LLP

(57) ABSTRACT

Rather than storing a table within a digital camera or other optical device of defective pixels within its image sensor, defective pixels are dynamically identified by comparing the output values of individual pixels under test with those of neighboring pixels. If the neighbors are all above or below the pixel under test by a defined threshold amount, the output of the pixel under test is replaced with a value calculated from the outputs of neighboring pixels.

9 Claims, 4 Drawing Sheets

FOREIGN PATENT DOCUMENTS

| | | |
|---|---|---|
| JP | 2004-112802 A | 4/2004 |
| WO | WO-2005011261 A1 | 2/2005 |

OTHER PUBLICATIONS

The Patent Office of the People's Republic of China, "Notification of the Second Office Action," corresponding Chinese Patent Application No. 200480023089.8, mailed on Feb. 13, 2009, 7 pages (including translation.).

China Patent Office, "Notification of First Office Action" (translated), mailed in corresponding Chinese Application No. 200480023089.8, on Jun. 24, 2008, 9 pages.

Notification of the Third Office Action, Chinese Patent Application No. 200480023089.8, dated Aug. 7, 2009, 8 pages.

Notification of Reasons for Refusal, Japanese Patent Application No. 2006-518648, dated Nov. 27, 2009, 6 pages.

Final Notification of Reasons for Refusal, Japanese Patent Application No. 2006-518648 dated Jul. 6, 2010, 4 pages.

Non Final Office Action Mailed Sep. 19, 2006 in Co-Pending U.S. Appl. No. 10/615,277, filed Jul. 7, 2003.

Non Final Office Action Mailed May 21, 2007 in Co-Pending U.S. Appl. No. 10/615,277, filed Jul. 7, 2003.

Non Final Office Action Mailed Oct. 22, 2007 in Co-Pending U.S. Appl. No. 10/616,277, filed Jul. 7, 2003.

Co-pending U.S. Appl. No. 10/615,277, filed Jul. 7, 2003.

Notice of Allowance Mailed Feb. 19, 2008 in Co-Pending U.S. Appl. No. 10/615,277, filed Jul. 7, 2003.

* cited by examiner

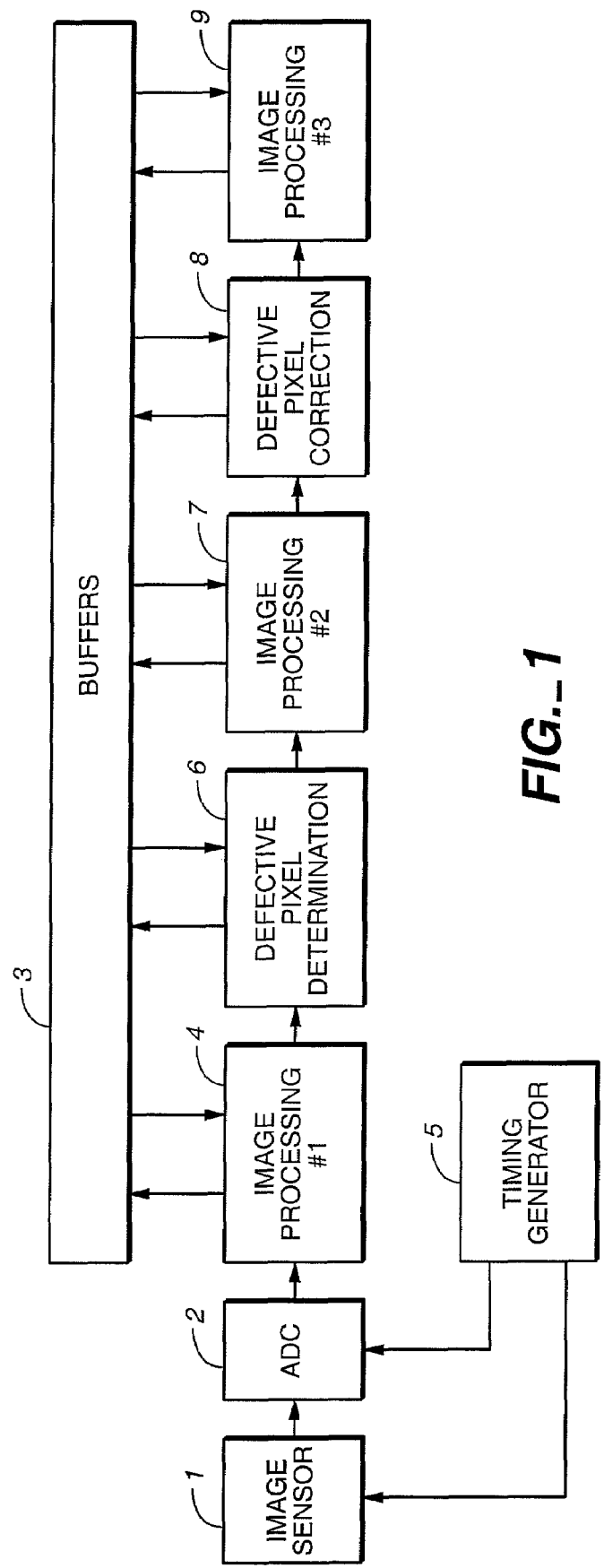
FIG._1

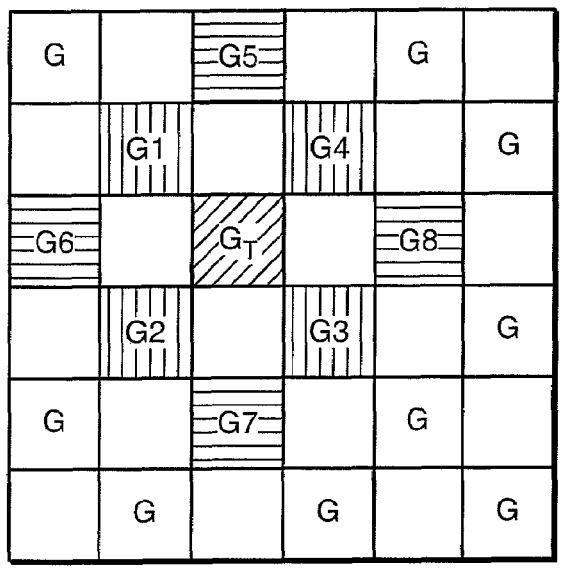
FIG._2A
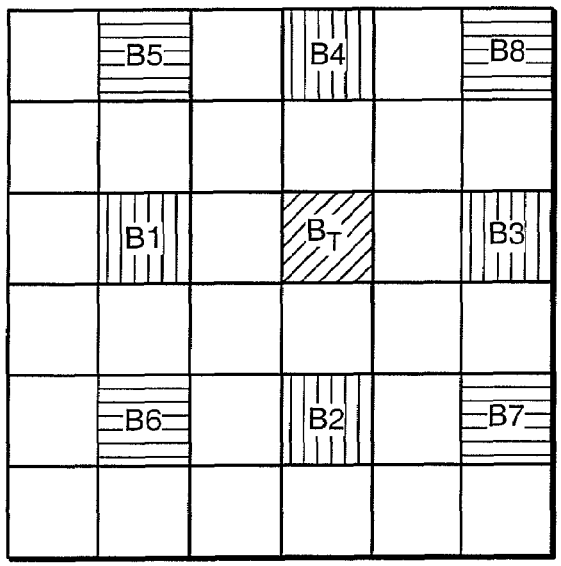
FIG._2B
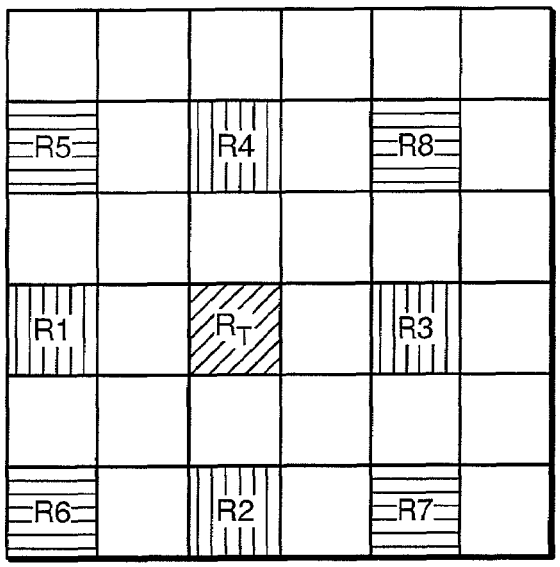
FIG._2C

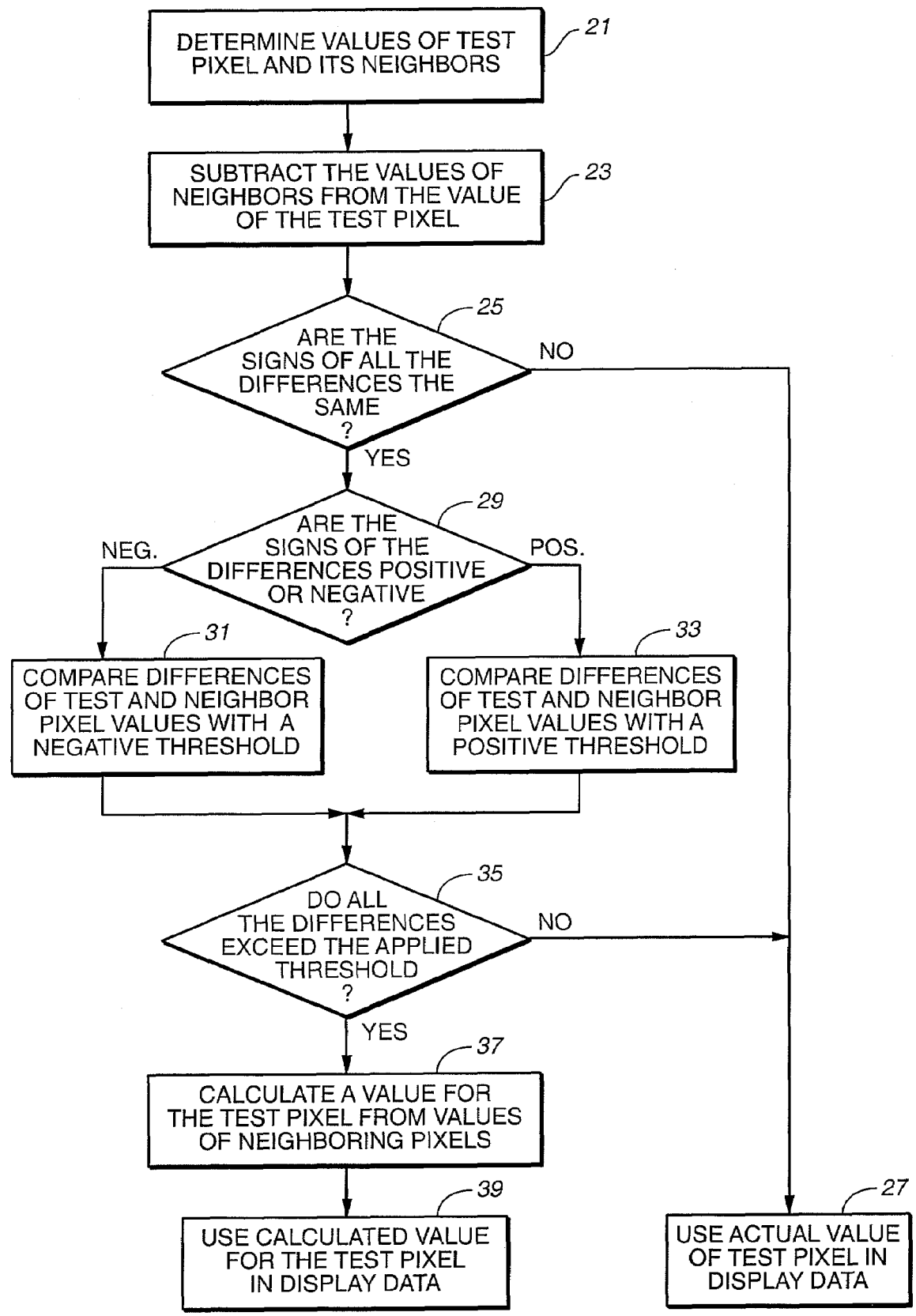
FIG._3

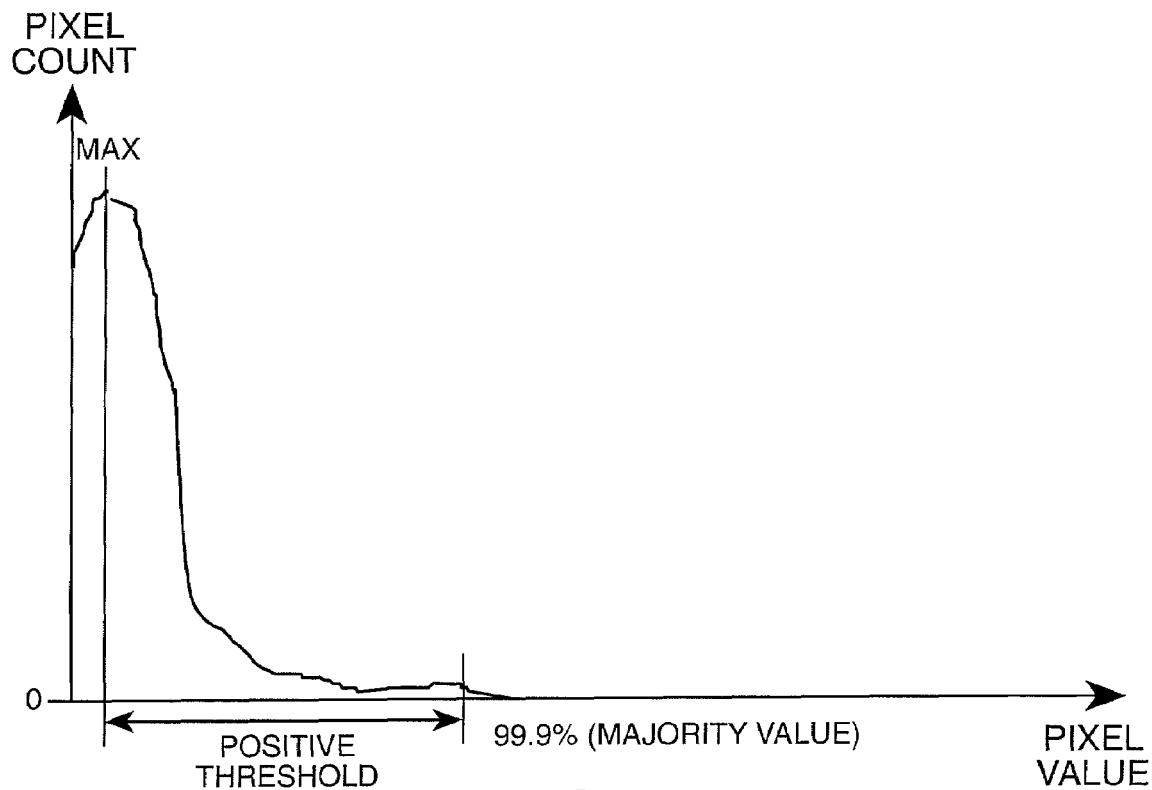
FIG._4
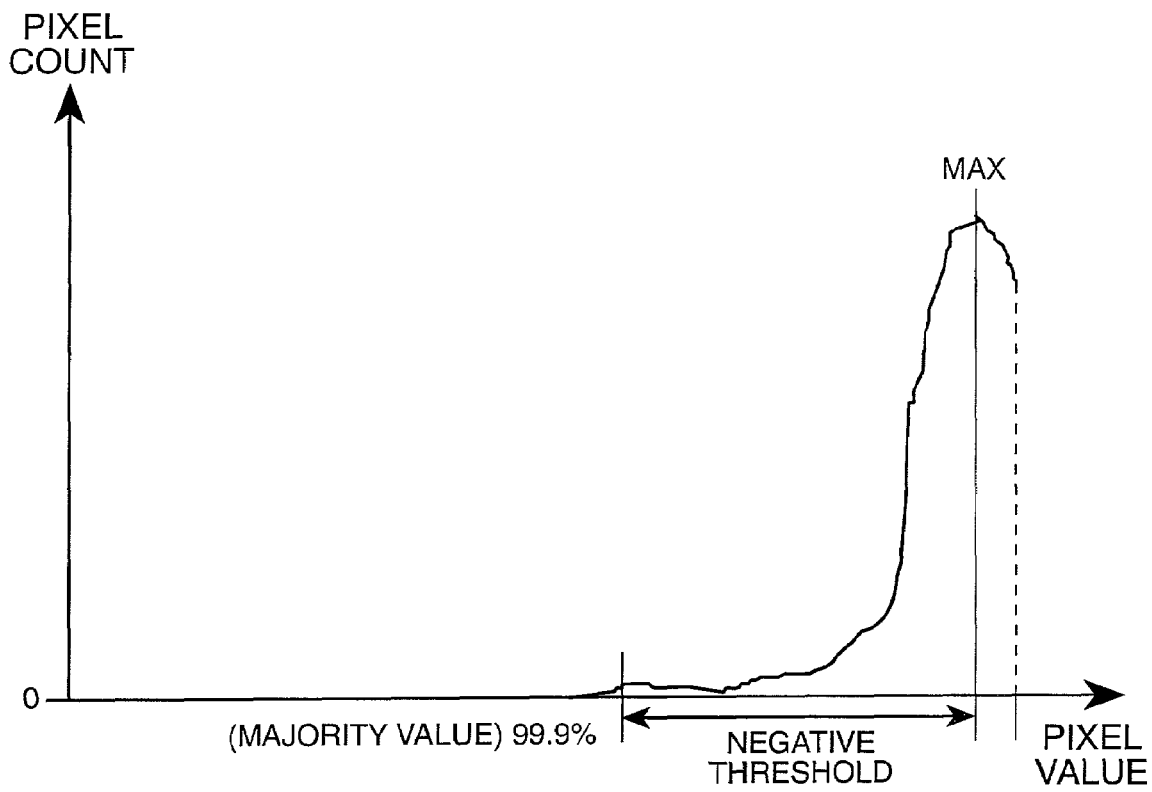
FIG._5

DYNAMIC IDENTIFICATION AND CORRECTION OF DEFECTIVE PIXELS

CROSS REFERENCE TO RELATED APPLICATIONS

This application is a continuation of application Ser. No. 10/615,277 filed Jul. 7, 2003, which application is incorporated herein in its entirety by this reference.

FIELD OF THE INVENTION

This invention relates generally to image sensors having a two-dimensional array of photo-detector pixel elements, and, more specifically, to techniques for identifying individual defective pixels and generating signals in place of those of the defective pixels.

BACKGROUND

Image sensors with an increasing number of image sensing photo-detector elements are being used in digital cameras designed to be sold in large quantities to consumers. Although such cameras most commonly utilize sensors having from 2 to 4 megapixels at the present time, it is not uncommon to find digital cameras available that employ image sensors as large as large as 5 to 6 megapixels. And this number will likely increase in the future. Normally, not all the light sensing elements in these sensors work correctly; some are defective. Defective light sensing elements do not react to light properly, and thus distort a resulting image. In some cases, one or more light sensing elements may always produce an output, even though light is not present. In other cases, a few may produce no light output even when very bright light impinges on their surface. The result can be a visible bright or dark spot in the captured image, respectively. In a third case, a light output is produced which is responsive to the light impinging on a sensor's surface, but this output is not correctly related to the light falling on the sensor. These pinpoint imperfections may be isolated or found in clusters. Since each pixel in the usual sensor captures information associated with different colors of the scene being photographed, these defective pixels are often visualized as pixels of the wrong color, not just pixels which are too light or too dark.

A great deal of time and cost is expended in sorting out image sensors with these imperfections. In order to be able to use as many of these partially defective sensors as possible, electronic defective pixel correction techniques are used. Such techniques employ a predefined list of locations which identify where the defective pixels are located in the sensor. The locations of these defective pixels are obtained by using a time consuming calibration procedure on each sensor. This procedure usually employs measuring the signal output of the sensor pixels with a black and then a white image incident on the sensor. For the black image, all light is blocked from the sensor and pixels with a higher output above a set threshold are identified as defective. Similarly, for the white image, a uniform illumination field is allowed to fall onto the sensor in order to identify any defective pixels that generate a lower output signal above a specified threshold. Any such pixels are considered "exceptional" and are included in a defective pixel list for each sensor that is tested. The list includes the locations in the array of the defective pixels.

When such a calibrated image sensor is installed in a digital camera or other host device, its defective pixel list is loaded into a memory of the digital camera in the form of a look-up table. During image processing, the digital camera's processor searches this lookup table to determine if a particular pixel is defective and therefore needs to be corrected. This correction usually takes the form of replacing the output from a defective pixel with a simple average of the outputs of good pixels adjacent to the defective pixel. As the number of pixels in a sensor becomes larger, the size of the memory necessary to store the look-up table increases as well as the time required to do the look-up and then calculate the average of the adjacent pixels.

SUMMARY OF THE INVENTION

Rather than identifying defective pixels one time during calibration of a sensor, the defective pixels are identified in real time as the sensor is being used in a digital camera or other host device, after the sensor has been installed into the device. This eliminates the need for the significant amount of memory capacity that is necessary to store a defective pixel table, thereby reducing the complexity and cost of the device. A time-consuming and costly calibration process to define locations of defective pixels is also eliminated. Further, since correction of defective pixels is not restricted to static defective pixel information, pixels that become defective after the sensor is installed into a host device are automatically identified and corrected. This overcomes an effect of sensor aging when individual pixels become defective over time. Processing to identify and correct defective pixels takes place while an image field projected onto the sensor is being captured by the digital camera or other device, and may be performed during the capture of every image.

According to one specific aspect of the present invention, the individual pixels of the sensor are tested rapidly one-at-a-time while the sensor is exposed to an image field having intensity and color variations across it such as occur in a normal photograph. The outputs of each given pixel under test and of neighboring pixels around it are measured. An early processing step calculates differences between the output of the pixel under test and the individual outputs of the neighboring pixels. If these differences include both positive and negative quantities, it is assumed that the pixel is good and the testing proceeds to the next pixel in turn. But if the differences are all positive or all negative, the given pixel is considered to possibly be defective and is tested further. Such a pixel is suspect because it is unusual for a given pixel to be brighter or dimmer than all of its surrounding neighbors. An advantage of this process is that the time necessary to determine that an individual pixel is good, which will typically be the result for nearly all the pixels of a sensor, can be quite short. According to another specific aspect of the present invention, the processing for the pixels under test that may be defective continues by comparing the pixel output differences with at least one threshold. If all the differences between the outputs of the pixel under test and its surrounding neighbors exceed a specified threshold, then the pixel is determined to be defective and a value for that pixel is calculated from the values of the surrounding pixels instead of using it for picture data. A different threshold can be used for comparison with neighboring pixels depending upon their distance across the sensor from the pixel under test. Recognizing that the likelihood of differences in the image on the sensor increases as the distance between pixels increases, the applied threshold increases as the distance away from the pixel under test increases.

According to a further specific aspect of the present invention, the threshold(s) applied to identify defective pixels may also be calculated from the responses of the pixels to at least one exposure of uniform light intensity. A distribution of pixel outputs results from such uniform exposure. The threshold for use with output differences of adjacent pixels is calculated from the distribution's spread, selected to include a percentage of the pixels that are normally good in such a sensor. The threshold used to compare differences with pixels further removed from the pixel under test is made to be greater. Preferably, the thresholds are calculated from data obtained from a sample number of cameras or other host devices using the same model sensor and imaging optical elements. Alternatively, although more complicated and expensive, the thresholds may be calculated in this way for each sensor during calibration of the device, and/or automatically calculated on occasion during use of the device in order to adapt the threshold(s) to any changes that take place in the sensor or imaging optics with use.

Although the various aspects of the present invention are described to be implemented with megapixel sensors, since such sensors are commonly used, the invention also has application to sensors of fewer pixels. Additional aspects, advantages and features of the present invention are included in the following description of exemplary examples thereof, which description should be taken in conjunction with the accompanying drawings.

BRIEF DESCRIPTION OF THE DRAWINGS

FIG. 1 is a block diagram that functionally represents image processing within a camera;

FIGS. 2A, 2B and 2C illustrate the physical arrangement of respective green, blue and red sensitive pixels of a particular type of sensor that may be used within the camera of FIG. 1;

FIG. 3 is a flow diagram illustrating processing within the camera of FIG. 1 to identify and correct defective pixels within its light sensor; and FIGS. 4 and 5 are curves showing distributions of pixel output values of sensors within cameras exposed to uniform light fields of two different values, for the purpose of determining threshold values used in identifying defective pixels.

DETAILED DESCRIPTION OF EXEMPLARY EMBODIMENTS

As depicted in FIG. 1, a camera includes an image sensor 1 that provides analog signals proportional to the light impinging on the sensor. The sensor signal is connected to an analog-to-digital converter (ADC) 2, which translates the sensor analog signals into digital signals. A timing generator 5 controls operation of the sensor 1 and the ADC 2. The digitized sensor output data then go through a chain of processing stages. Two of these stages are defective pixel determination 6, which identifies defective pixels, and defective pixel correction 8, which corrects a located defective pixel from outputs of pixels neighboring the identified defective pixel. Image processing stages 4, 7 or 9 may or may not be included. Each one of the processing chain stages can use the buffer 3 to pass the processed image data to succeeding stages, and can employ the buffers 3 for temporary storage of data created as part of the processing performed. The camera also includes an optical system (not shown) for directing a light pattern onto the sensor 1, and usually also includes a mechanical shutter and a controllable aperture.

Referring to FIGS. 2A-C, a small portion of one format of pixel array for the sensor 1 is illustrated, separately showing respective green (G), blue (B) and red (R) sensitive pixels. In the examples described, the process of identifying and correcting for defective pixels is performed separately for pixels of each of these primary colors. That is, the green pixel $G_T$ is being tested by use of its neighboring green pixels G1-G8, the blue pixel $B_T$ is being tested by use of its neighboring blue pixels B1-B8 and the red pixel $R_T$ is being tested by use of its neighboring red pixels R1-R8.

The defective pixel determination techniques described herein are based upon the fact that image sensors and their optics produce sensor output electrical signals with a limited bandwidth. Thus, the location of a high frequency change in the value of the output of a pixel or pixels is an indication of a defective pixel. A "positive" pixel under test is a pixel that outputs a value greater than the outputs of all of its neighbors, and a "negative" pixel under test is a pixel that outputs a value smaller than the outputs of all its neighbors. A positive pixel under test is determined to be defective when its output exceeds that of its neighbors by one or more positive thresholds, while a negative pixel under test is determined to be defective when its output is less than that of its neighbors by one or more negative thresholds. In one embodiment, the neighboring pixels that are considered include all pixels of the same color that are immediately above, below, to the left, to the right, and diagonally adjacent in all four corners to the pixel under test.

The processing performed by the defective pixel determination and correction blocks 6 and 8 of FIG. 1 is illustrated by the flowchart of FIG. 3, with reference to the example pixel patterns of FIGS. 2A-2C. Standard data normalizing steps (not shown) may additionally be included, and the order of the steps of FIG. 3 may be altered from the order shown.

A first step 21 reads the digitized and/or processed output values of a pixel under test and its neighbors. If the green pixel $G_T$ of FIG. 2A is under test, its output and that of at least adjacent neighboring green pixels G1-G4 are read, and possibly also green pixels G5-G8 that are further removed from $G_T$. Similarly, by referencing FIG. 2B when the blue pixel $B_T$ is under test, it and neighboring blue pixels B1-B4 are read, and possibly also the slightly further displaced blue pixel neighbors B5-B8. Lastly, if the red pixel $R_T$ of FIG. 2C is under test, it and neighboring red pixels R1-R4 are read and possibly also neighboring red pixels R5-R8 that are slightly further removed from pixel $R_T$ than pixels R1-R4.

In a next step 23 of FIG. 3, the output values of the neighboring pixels are individually subtracted from the output value of the pixel under test. For example, if the green pixel $G_T$ is under test, the values of each of at least the closest neighbors G1-G4 are subtracted from the value of $G_T$, and preferably also the further neighboring pixels G5-G8. This gives either four or eight difference quantities. For the example of the algorithm using all eight difference quantities, they can be expressed as follows:

$$D1=G_T-G1; D2=G_T-G2; D3=G_T-G3; D4=G_T-G4;$$
$$D5=G_T-G5; D6=G_T-G6; D7=G_T-G7; D8=G_T-G8.$$

Four or eight differences are also formed with neighboring pixels when either the blue pixel $B_T$ or red pixel $B_R$ is under test instead.

The signs of the eight differences D1-D8 are then examined, in a step 25, in order to determine whether they are all the same. If they are not the same sign, a result has been reached. It has then been determined that the pixel under test is good, so its value is utilized in the data file of the picture, as indicated by a step 27. But if the signs of the eight differences D1-D8 are all the same, this indicates that the pixel under test may be defective. It is unlikely that differences between the single pixel under test and all its surrounding neighbors will have the same sign. It is possible that the optical field incident on the sensor will show high frequency characteristics in a few directions, for example if there are lines and corners in the image, but if high frequency characteristics are displayed in all directions, which means that the pixel under test has a value greater than all its neighbors or smaller than all its neighbors, the pixel under test is strongly suspected of being defective. But before the pixel under test is declared to be defective, the magnitude of the differences with its neighbors are examined.

As indicated by steps 29, 31, 33 and 35 of FIG. 3, the differences are compared to one or more thresholds, and the pixel under test is declared to be defective if the differences exceed the threshold(s). It is desirable to maintain different threshold levels for differences that are positive and those that are negative. Therefore, in a step 29, cases where the differences are all negative are caused, in a step 31, to be compared with one or more negative thresholds. Similarly, if the differences are determined by step 29 to be positive, these differences are compared in a step 33 to one or more positive thresholds. Regardless of whether they are positive or negative differences, it is determined in the step 35 whether the absolute values of each of the differences exceed the applied threshold(s). If not, the pixel is declared to be a good one, and its output value is used as part of the image data, as indicated by a step 27.

But if all the differences exceed the applied threshold(s), it is determined that the pixel is defective and that its output value should not be used as part of the image display data. An optical field of an object scene projected onto a sensor will seldom if ever have such a high resolution as to have one pixel so different from all of its neighbors. The function of the defective pixel determination block 6 of FIG. 1 has then been completed. Correction of the pixel output value subsequently takes place in accordance with the function of block 8. This is accomplished by calculating a value for the defective pixel from the output values of its neighboring pixels, and then substituting the calculated value for that of the actual output value of the defective pixel.

This calculation and substitution are indicated to take place by steps 37 and 39 of FIG. 3. One straightforward way to calculate the value of the defective pixel is to take a simple arithmetic average of the values of at least some of the neighboring pixels. The neighbors chosen for this average need not be the same as those used to determine that the pixel was defective but can be. For example, in the case of the green pixels illustrated in FIG. 2A, the average can be taken of the most immediate neighbors G1-G4 while omitting the further displaced neighbors G5-G8 that may have been used in the calculation that identified the pixel as defective.

Although an average of close by, same color, neighboring pixel values are preferably used, many other mathematical functions, other than a simple average, can be employed instead. Such functions can be either linear or non-linear and take into consideration not only the difference value of each close by neighboring pixel of the same color as compared to other neighboring pixels of the same color surrounding the identified defective pixel, but also employ additional values from image pixels multiple rows or columns away from the defective pixel and/or from pixels of a different color than the defective pixel. Further, although in this example the pixel value of the defective pixel is discarded, in certain circumstances it may be beneficial to retain the output value of the defective pixel and employ this value in the replacement pixel value calculation.

From the above discussion of identifying defective pixels, it can be seen that a pixel is identified as having excessive high frequency characteristics if its value is greater or smaller than the values of surrounding pixels by predetermined thresholds. This can be visualized as a pixel spike in a field of fairly uniform pixels. Since such a pixel spike should not exist, because of the low pass filtering behavior of the optics in the digital camera or other host device, the pixel which caused the spike is determined to be defective.

The use of a single negative and a single positive threshold for each of the three colors is preferably used. But if the more distant neighbors, such as pixels G5-G8, are used in the determination of whether the pixel $G_T$ is defective or not, a different threshold level can be compared to the differences with those pixels than to the differences with the closer neighbors G1-G4.

The threshold values used in the defective pixel determination process are most conveniently found by analyzing the defective pixel statistics of a number of cameras or other devices that employ the same type of image sensor. This analysis is done once to characterize the defect properties of a particular image sensor family, not for each camera manufactured. It should be performed once for each different camera model having a particular type image sensor and optics, by testing a few representative cameras. This provides representative statistical data for the distribution of defective image sensor pixels. Once the threshold values are so determined, they are then stored in a non-volatile memory of each camera or other device for use by the device during the identification of defective pixels.

Referring to FIG. 4, a technique is explained for determining positive thresholds for a model of camera or other device using a particular type of sensor and imaging optics. All light is blocked from the sensor of the device being tested and data are gathered of the individual pixel outputs. This is preferably repeated for a number of the same model device. All the data are then combined into a histogram of pixel count as a function of pixel value, as shown in FIG. 4. For each "black picture" histogram thus created, the pixel value displayed by the largest number of image sensor pixels, the Max Value, is then determined. Also, the pixel value under which almost all pixels that are equal to or greater than the Max Value, the Majority Value (for example 99.9%), of the image sensor pixel outputs fall below is selected. The Majority Value minus the Max Value is used as the positive threshold for this model of camera or other device. The pixels having values above the Majority Value will then be treated as defective pixels in the course of carrying out the process of FIG. 3.

The Majority Value cut off that is used when determining the positive threshold can be a percentage as shown or a particular Pixel Value. The actual Majority Value may be rather arbitrary but is preferably chosen to have a number of pixels outside the "positive threshold" region of the histogram of FIG. 4 that maximizes the quality of images formed from the processing of FIG. 3.

The negative thresholds are determined by a similar technique, illustrated by FIG. 5. The sensor of a camera under test is fully illuminated, and data taken of the outputs of the pixels. This is done for several cameras, the data accumulated for several tested same model cameras and a histogram of pixel count as a function of pixel value is created, as shown in FIG. 5. For each almost saturated "white picture" histogram thus created, the pixel value displayed by the largest number of image sensor pixels, the Max Value, is determined and the pixel value over which almost all pixels that are equal to or less than the Max Value, the Majority Value (for example 99.9%), of the image sensor pixel outputs fall above is found. The Max Value minus the Majority Value is used as the negative threshold for this model camera.

As will be noticed from FIGS. 2A-C, a particular type of sensor has been assumed in the descriptions of techniques above. This is a typical type of commercial sensor, wherein photo-detectors extend along the rows that are covered with red, green and blue filters. One row contains alternating red and green sensitive photo-detectors, while the next row contains alternating blue and green sensitive photo-detectors, the photo-detectors also being positioned along the rows to provide alternating color sensitivity in columns. Most image sensors employed in digital cameras available today utilize this type of sensor, which have more photodetector sites allocated to the color green than allocated to the other two colors blue and red. Because the human eye is most sensitive to the color green, correcting for just the defective green pixels, and not correcting for the defective blue and red pixels, can still result in significant improvements in image quality. In addition to the type of sensor shown herein, the techniques of the present invention can be used with sensors having other arrangements of color pixels.

Another type of photo-sensor that is commercially available stacks multiple photo-detectors at each photo-site. The top detector passes the colors red and green, while filtering out the color it is sensitive to, for example blue. The detector immediately beneath this top detector passes the color green and filters out the color it is sensitive to, in this example red. The bottom sensor is then sensitive to the color green. There are an equal number of green, red and blue sensors. The techniques described above may be similarly applied to this type of sensor.

Although the various aspects of the present invention have been described with respect to exemplary embodiments thereof, it will be understood that the present invention is entitled to protection within the full scope of the appended claims.

It is claimed:

1. A method of distinguishing high quality elements from defective elements in an array of photo-sensitive elements, the method comprising:
   calculating a plurality of difference values for a first element of the array of photo-sensitive elements by comparing the output of the first element to the outputs of a corresponding plurality of elements neighboring the first element;
   determining whether the sign values of the plurality of calculated difference values fall within at least a first, second or third group wherein the first group being the sign values are all positive, the second group being the sign values are all negative, and the third group being the sign values are neither all positive nor all negative;
   in response to a determination that the sign values of the plurality of difference values fall within the first and second groups comparing each of the plurality of difference values with at least one defect determination threshold, and
   in response to a determination that the sign values of the plurality of difference values fall within the third group identifying the first element to be of high quality.

2. The method of claim 1, where each of the elements of the array provide an output sensitive to one of a plurality of colors and each of difference values is calculated between the output of the first element and a respective neighboring element sensitive to the same color as the first element.

3. The method of claim 1, where the elements of the array are arranged into rows and columns and the plurality of elements neighboring the first element includes elements from a different row than that to which the first element belongs.

4. A method of identifying and correcting defective ones of an array of photo-sensitive pixels, comprising:
   directing an object field of varying light intensity across the array;
   calculating a plurality of difference values for a first element of the array of photo-sensitive elements by comparing the output of the first element to the outputs of a corresponding plurality of elements neighboring the first element;
   determining whether the sign values of the plurality of calculated difference values fall within at least a first, second or third group wherein the first group being the sign values are all positive, the second group being the sign values are all negative, and the third group being the sign values are neither all positive nor all negative;
   in response to a determination that the sign values of the plurality of difference values fall within the first and second groups, performing a process including:
      determining whether one or more of the difference values are in excess of the threshold,
      in response to a determination of one or more of the difference values not exceeding the threshold, utilizing the output of the first pixel for data of the object field, and
      in response to a determination of all of the difference values exceeding the threshold, calculating a pixel value of the first pixel from at least some of the neighboring pixels and utilizing the calculated pixel value for data of the object field; and
   in response to a determination that the sign values of the plurality of difference values fall within the third group, utilizing the output of the first pixel for data of the object field without comparing the difference values with a defect determination threshold.

5. The method of claim 4, wherein said threshold includes either of at least first or second quantities that are different from each other depending upon whether said same sign is positive or negative.

6. The method of claim 4, wherein said threshold includes either of at least first or second quantities that are different from each other depending upon a distance between the first pixel and the neighboring pixel with which the corresponding difference was computed.

7. The method of claim 4, wherein a value of said threshold is dependent upon both (a) whether said same sign is positive or negative and (b) a distance between the first pixel and the neighboring pixel with which the corresponding difference was computed.

8. The method of claim 4, where each of the pixels of the array provide output sensitive to one of a plurality of colors and each of difference values is calculated between the output of the first pixel and a respective neighboring pixel sensitive to the same color as the first pixel.

9. The method of claim 4, where the pixels of the array are arranged into rows and columns and the plurality of pixels neighboring the first pixel includes pixels from a different row than that to which the first pixel belongs.

* * * * *